(12) United States Patent
Anderson et al.

(10) Patent No.: US 11,186,505 B1
(45) Date of Patent: Nov. 30, 2021

(54) TREATMENT SYSTEMS INCLUDING COVER SYSTEMS AND MEDIA

(71) Applicant: Industrial & Environmental Concepts, Inc., Lakeville, MN (US)

(72) Inventors: Dave Anderson, White Bear Lake, MN (US); Michael Sean Gallant, Edina, MN (US); Michael Allan Morgan, Edina, MN (US); Dorothy Paszek, Athens, GA (US)

(73) Assignee: Industrial & Environmental Concepts, Inc., Lakeville, MN (US)

( * ) Notice: Subject to any disclaimer, the term of this patent is extended or adjusted under 35 U.S.C. 154(b) by 754 days.

(21) Appl. No.: 15/072,012

(22) Filed: Mar. 16, 2016

Related U.S. Application Data

(60) Provisional application No. 62/133,900, filed on Mar. 16, 2015.

(51) Int. Cl.
*C02F 3/28* (2006.01)
*C02F 3/10* (2006.01)
*C02F 101/16* (2006.01)

(52) U.S. Cl.
CPC ............ *C02F 3/2866* (2013.01); *C02F 3/101* (2013.01); *C02F 2101/163* (2013.01); *C02F 2101/166* (2013.01); *C02F 2203/006* (2013.01)

(58) Field of Classification Search
CPC .................................................. Y10S 210/09
USPC .... 71/21; 210/138, 150, 220, 603, 605, 615, 210/621, 622, 630, 916
See application file for complete search history.

(56) References Cited

U.S. PATENT DOCUMENTS

| | | | |
|---|---|---|---|
| 4,169,050 A | | 9/1979 | Serfling et al. |
| 5,468,392 A | | 11/1995 | Hanson et al. |
| 5,861,095 A | * | 1/1999 | Vogel ........................ C02F 3/00 210/150 |
| 6,136,194 A | | 10/2000 | Vogel et al. |
| 6,558,548 B2 | | 5/2003 | Svirklys et al. |
| 6,851,891 B2 | | 2/2005 | Baumgartner et al. |
| 6,855,253 B2 | | 2/2005 | Baumgartner et al. |
| 6,905,602 B1 | | 6/2005 | Doble et al. |
| 7,468,133 B1 | * | 12/2008 | Norton ................... A01C 3/023 210/170.08 |
| 7,727,397 B2 | | 6/2010 | Gerardi et al. |
| 2009/0321351 A1 | | 12/2009 | Young |

(Continued)

FOREIGN PATENT DOCUMENTS

GB WO 2012/123767 A2 * 9/2012 ............... A47K 5/12

*Primary Examiner* — Hayden Brewster
(74) *Attorney, Agent, or Firm* — Norton Rose Fulbright US LLP

(57) ABSTRACT

A treatment system is disclosed and includes a storage basin for retaining liquid, a cover system that covers the storage basin, and media disposed within liquid retained in the storage basin. In an embodiment, the media may be attached to the cover system. In an additional or alternative embodiment, the media may be detached from the cover system. In some embodiments of treatment systems having detached media, one or more stands may be provided for supporting the media. Configuring the treatment system to include both the cover system and the media may improve the operational efficiency of the storage basin, and may increase the volume or amount of liquid that may be treated by the treatment system.

34 Claims, 6 Drawing Sheets

(56) References Cited

U.S. PATENT DOCUMENTS

2012/0152832 A1* 6/2012 Johnson .................... C02F 3/02
                                                          210/615
2015/0041376 A1* 2/2015 Fulford ................... C02F 3/103
                                                          210/143

* cited by examiner

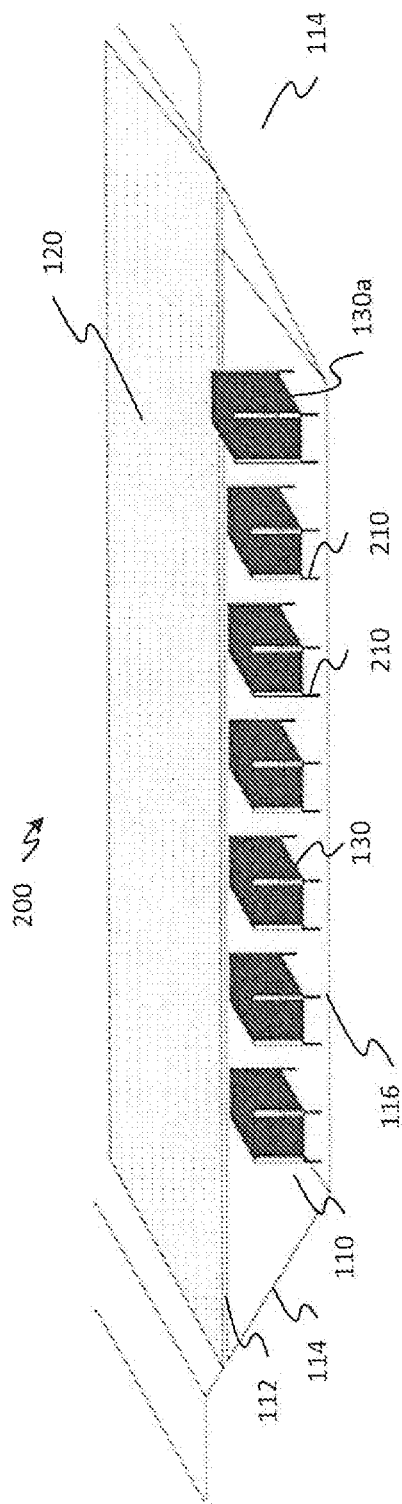
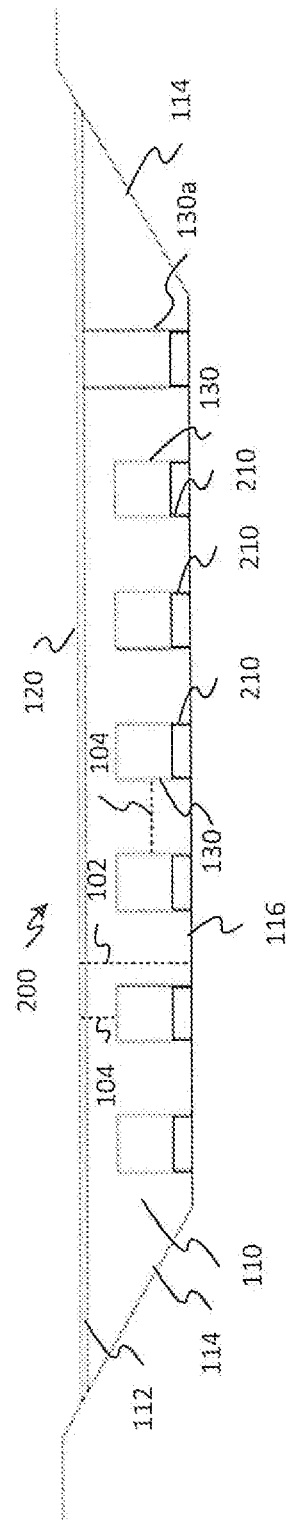
FIG. 2A
FIG. 2B

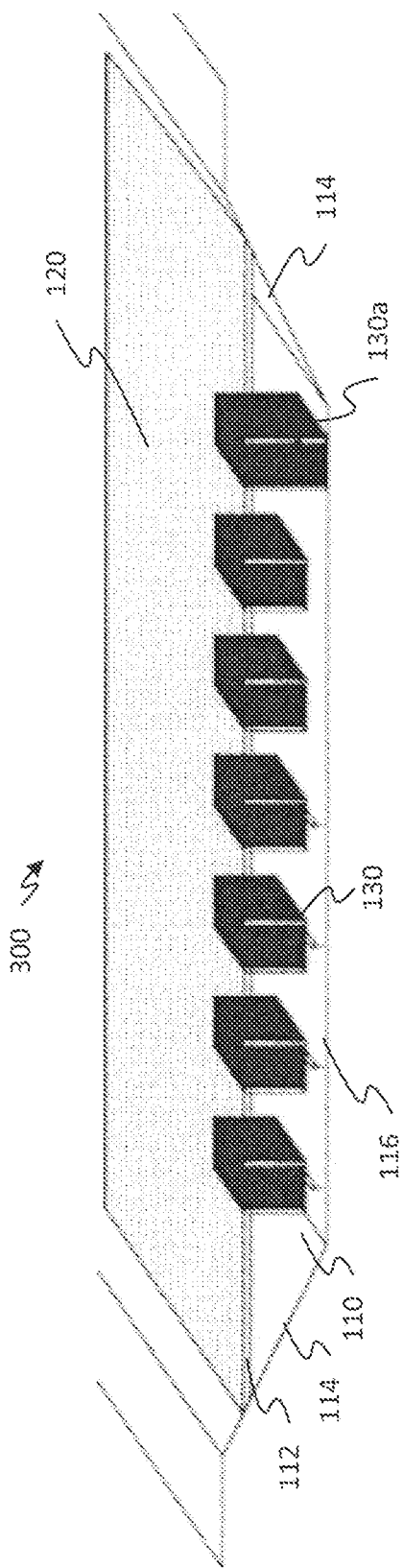
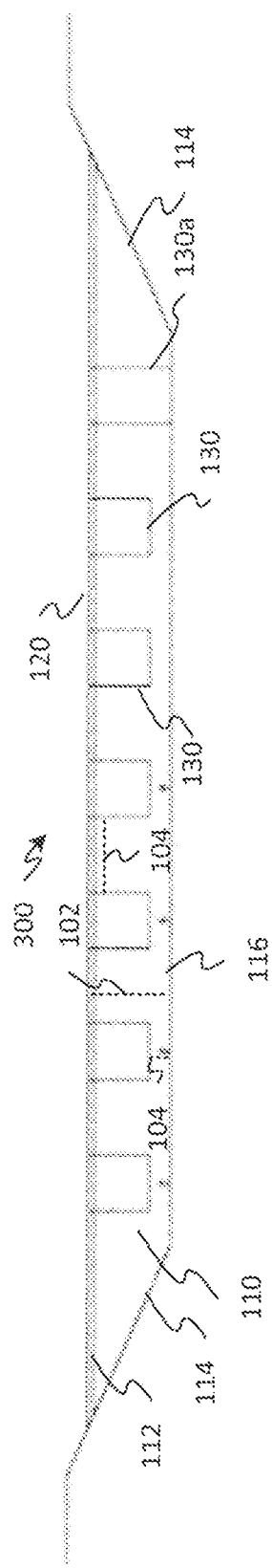
FIG. 3A
FIG. 3B

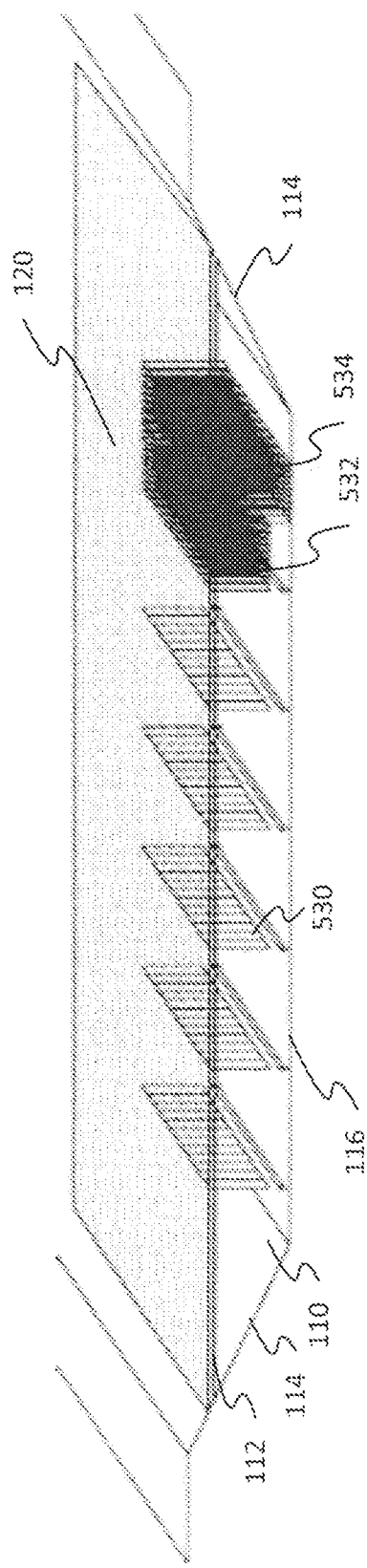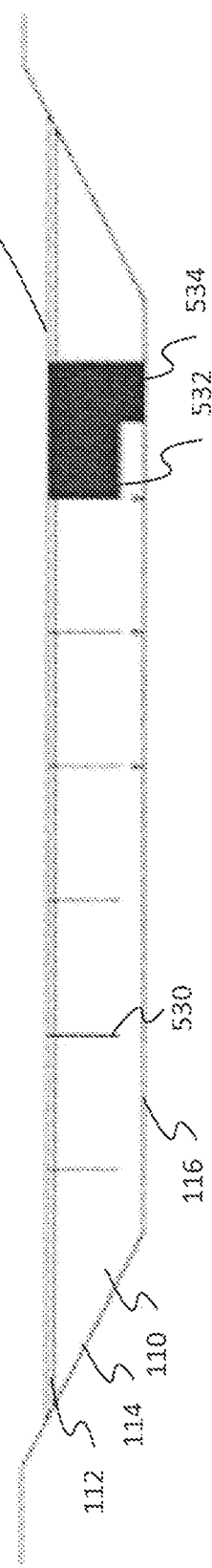

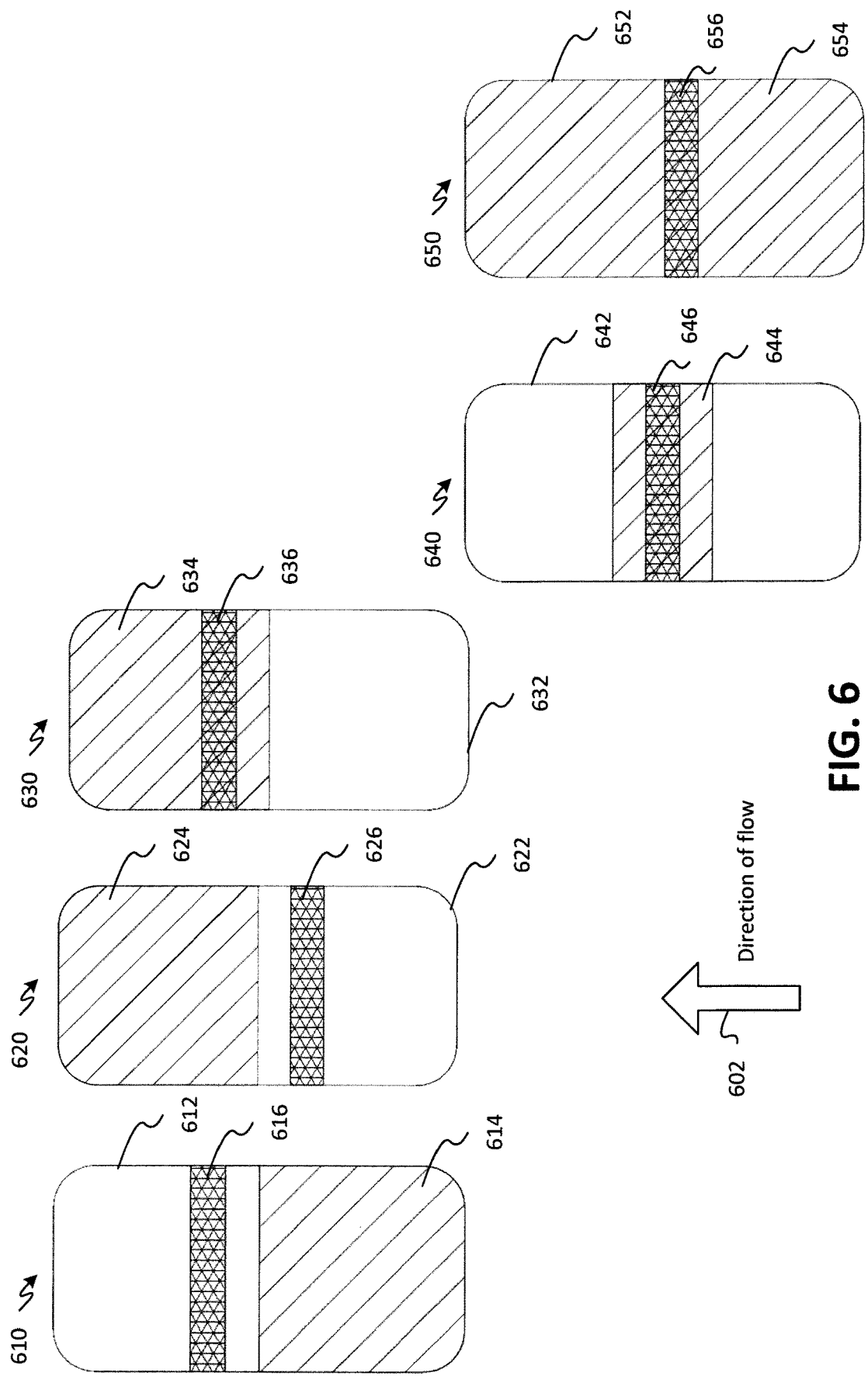

TREATMENT SYSTEMS INCLUDING COVER SYSTEMS AND MEDIA

CROSS-REFERENCE TO RELATED APPLICATIONS

This application claims the benefit of U.S. Provisional Patent Application No. 62/133,900, entitled, "TREATMENT SYSTEMS INCLUDING COVER SYSTEMS AND MEDIA," filed on Mar. 16, 2015, the content of which is expressly incorporated by reference herein in its entirety.

BACKGROUND

1. Field of the Invention

This disclosure relates generally to water treatment systems, and more particularly to water treatment systems that include covers and media.

2. Description of Related Art

Treatment systems are widely used to treat water and other liquids. Such systems come in a variety of configurations. In a first treatment system configuration, the treatment system includes a storage basin and a cover system. The cover system may cover the storage basin and may be formed from a geomembrane material. In an alternate treatment system configuration, the treatment system includes a storage basin and media disposed within liquid retained in the storage basin. In practice, these different treatment system configurations are used in a mutually exclusive manner. That is to say, a treatment system may include the storage basin and the cover system, or may include the storage basin and the media, but would not be configured to include the storage basin, the cover system, and the media.

SUMMARY

The present disclosure is the culmination of many years of research pertaining to the performance of liquid treatment systems. As part of that research, the effects of water movement, the effects of detention times (e.g., how long the liquid was retained in the storage basin), the effects of aeration and anaerobic gases on baffles and solid deposition and displacement, and samples from the liquid treatment systems were studied to generate profiles and models of flow characteristics. Additionally, extensive temperature studies were conducted on several liquid treatment systems using temperature sensors that recorded monthly and daily temperatures of the liquid retained with the liquid treatment systems over a period of 2 years. From the temperature studies, heat loss records were created reflecting the effects that different insulating R-Values for cover systems had on heat retention and what areas within those treatment systems could be used for nitrification. From this research, proprietary and predictive heat modeling techniques were developed for treatment systems. Additionally, it was established that maintaining heat in the liquid (i.e., preventing the liquid from cooling too much) was critical for ammonia reduction, which is accomplished through nitrification, which is a process for the conversion or decomposition of ammonia using autotrophic bacteria, such as *Nitrosomonas* and *Nitrobacter*, which are a specialized bacteria that are susceptible to changes in their environment, such as nutrients, pH, alkalinity, and temperature. Most of these factors, such as the pH, alkalinity, and availability of nutrients, are abundant, and/or naturally occurring within the required tolerances for nitrification to occur. However, controlling the temperature and the size of the microbial populations (e.g., the quantity of bacteria) in the treatment system such that nitrification can occur proved to be more difficult.

Further studies were conducted along pre-determined transects of treatment systems using sampling techniques, and those studies revealed that nitrification occurred in treatment systems at a rate that was much higher than was generally known or had been previously published under certain conditions and warmer temperatures. In the studied treatment systems, the microbial populations were present as free floating or in suspended particulates, and it was discovered that inflow and infiltration (I&I) could "washout" the microbial populations, causing a significant decline in the microbial populations and disrupting the nitrification process and the metabolic activity of the treatment system. This created a lag time whereby the microbial populations attempted to re-establish their population. Uncontrolled conditions, such as temperature, were discovered to, in some cases, prevent the populations from reaching their previous levels. Additionally, as the free floating and suspended microbial populations grow in size, the microbial populations may settle to the bottom of the treatment system, where the population may die, or at the very least have significantly decreased performance with regard to treating the liquid. Thus, during the lag time, the performance of the treatment system was significantly reduced. To reduce or eliminate the lag time and loss of the microbial populations due to I&I and settlement, the present disclosure proposes embodiments of treatment systems utilizing cover systems (e.g., for temperature control) and media, where the media provides a structure that the microbial populations may grow on and be sheltered from the effects of I&I. Additionally, the media reduces the likelihood that the microbial populations will settle to the bottom of the treatment system at higher population densities, thus improving the performance of the treatment system by maintaining a more consistent microbial population that is actively and efficiently treating the liquid retained in the treatment system. It is noted that the studies resulting in the treatment systems described in the embodiments disclosed herein are typically low flow treatment systems utilizing lagoons, ponds, tanks, or other structures to retain liquid for a period of time, rather than high flow wastewater treatment systems that use specialized and advanced equipment and mechanical systems, such as activated sludge systems, oxidization ditches, sbr's (sequencing batch reactors), and rbc's (rotating biological contactors).

The present application discloses embodiments of treatment systems that include a storage basin, a cover system, and media, and to methods for providing treatment systems according to embodiments. In an embodiment, a treatment system includes a storage basin for retaining liquid, a cover system sized and dimensioned to cover at least a portion the storage basin, and media disposed within the liquid retained in the storage basin. The media may provide an environment for proliferation of microbial populations that may be used to treat the liquid retained in the storage basin, and the cover system may provide insulation to the liquid to reduce fluctuations in the temperature of the liquid. By reducing the temperature fluctuation of the liquid, the microbial populations may become more stable, allowing the treatment system to operate at a high treatment efficiency over a broader range of environmental conditions.

In another embodiment, a method for configuring a treatment system is disclosed and includes providing a storage basin for retaining liquid, providing a cover system sized and dimensioned to cover the storage basin, and disposing media within the liquid retained in the storage basin. The media may provide an environment for proliferation of microbial populations that may be used to treat the liquid retained in the storage basin, and the cover system may provide insulation to the liquid to reduce fluctuations in the temperature of the liquid. By reducing the temperature fluctuation of the liquid, the microbial populations may become more stable, allowing the treatment system to operate at a high treatment efficiency over a broader range of environmental conditions.

Treatment systems configured according to embodiments may realize improved performance over existing treatment systems (e.g., treatment systems including media or cover systems, but not both). For example, as temperatures cool, the liquid retained within or provided to the storage basin also cools, which may cause the treatment process performed by the microbial populations residing on the media to slow down, and in some instances killing the microbial populations. When this occurs, the treatment process underperforms or ceases, reducing the effectiveness of the treatment system or nullifying the treatment system. Additionally, the cooler temperatures typically have little effect on the volume of liquid that requires treatment so that, even as temperatures cool, the amount of liquid passed through the treatment system may remain relatively constant. Thus, as temperatures of the liquid cool and the microbial populations decline, treatment systems including only media are less likely to adequately treat the liquid. However, the treatment systems of embodiments include both cover systems and media. In such configurations, the cover system provides insulation to the liquid retained in the storage basin, thereby reducing the effects of temperature fluctuations and reducing the loss of microbial populations and the decline of the treatment process provided by the microbial populations. Additionally, the media provides an environment where the microbial populations can grow and thrive, thereby increasing the effectiveness of the treatment process and increasing the volume of liquid that may be treated using the treatment systems of embodiments.

Further, while treatment systems having only cover systems may receive the insulating effects provided by cover systems, such treatment systems are susceptible to loss of microbial populations due to other causes, such as settling of floc or population washing out due to high flows, or I&I. For example, in treatment systems that do not include media, microbial populations may be found suspended in the liquid retained in the storage basin. Over time, these microbial populations may grow in size until they reach a point where the size of the microbial population causes it to settle to the bottom of the storage basin. This process is known as flocculation. When this occurs, the microbial populations that have settled to the bottom of the storage basin typically die, and, at the very least, the effectiveness at which they treat the liquid is greatly reduced. This causes fluctuations in the effectiveness of the treatment of the liquid and reduces the efficiency of the treatment system. In contrast, the treatment systems of embodiments includes the cover systems and media. Thus, the treatment systems of embodiments are less likely to suffer loss of microbial populations due to floc, and are less susceptible to fluctuations in the effectiveness of the treatment process, and may be able to treat a larger volume of liquid in a reduced amount of time (e.g., due to the increased or more stable operational efficiency provided by the microbial populations residing on the media). Thus, the treatment systems of embodiments provide improvements to the technical field of wastewater treatment, and improve the performance of treatments systems for treating liquids.

The term "coupled" is defined as connected, although not necessarily directly. The terms "a" and "an" are defined as one or more unless this disclosure explicitly requires otherwise.

The terms "substantially," "approximately," and "about" are defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

A device, system, or component of either that is configured in a certain way is configured in at least that way, but it can also be configured in other ways than those specifically described.

Any embodiment of any of the systems and methods can consist of or consist essentially of—rather than comprise/include/contain/have—any of the described elements, features, and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWING

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

FIG. 2A is a perspective view of a second embodiment of a treatment system including a storage basin, a cover system, and media;

FIG. 2B is a profile view of the second embodiment of a treatment system including a storage basin, a cover system, and media;

FIG. 3A is a perspective view of third embodiment of a treatment system including a storage basin, a cover system, and media;

FIG. 3B is a profile view of an embodiment of a treatment system including a storage basin, a cover system, and media;

FIG. 5A is a perspective view of various embodiments of media configurations for use in conjunction with a treatment system;

FIG. 5B is a profile view of various embodiments of media configurations for use in conjunction with a treatment system; and FIG. 6 is a plan view of various configurations of treatment systems configured according to embodiments.

DESCRIPTION OF ILLUSTRATIVE EMBODIMENTS

The following detailed description and drawings provide some non-limiting and non-exhaustive embodiments of the present treatment system configurations. Embodiments of the present treatment systems may be used with liquid storage ponds to cover any liquids, such as or water, wastewater or manure comprising oil, such as petroleum that is extracted from the earth through a process like hydraulic fracturing.

Figure 1A:
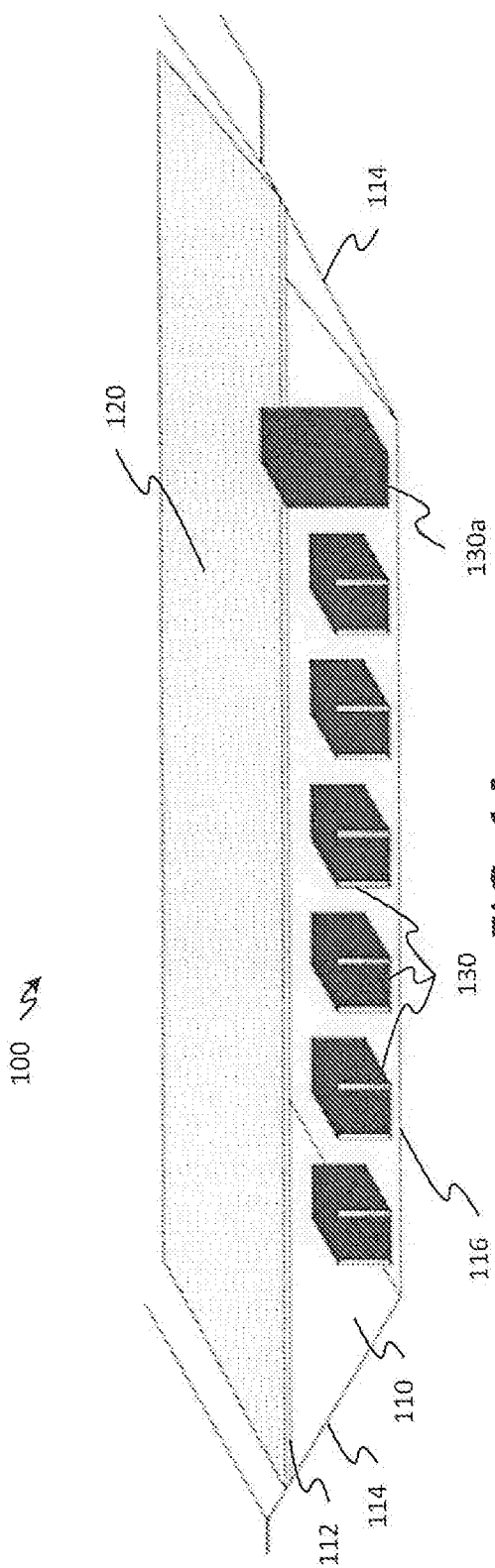
FIG. 1A is a perspective view of a first embodiment of a treatment system including a storage basin, a cover system, and media.
Figure 1B:
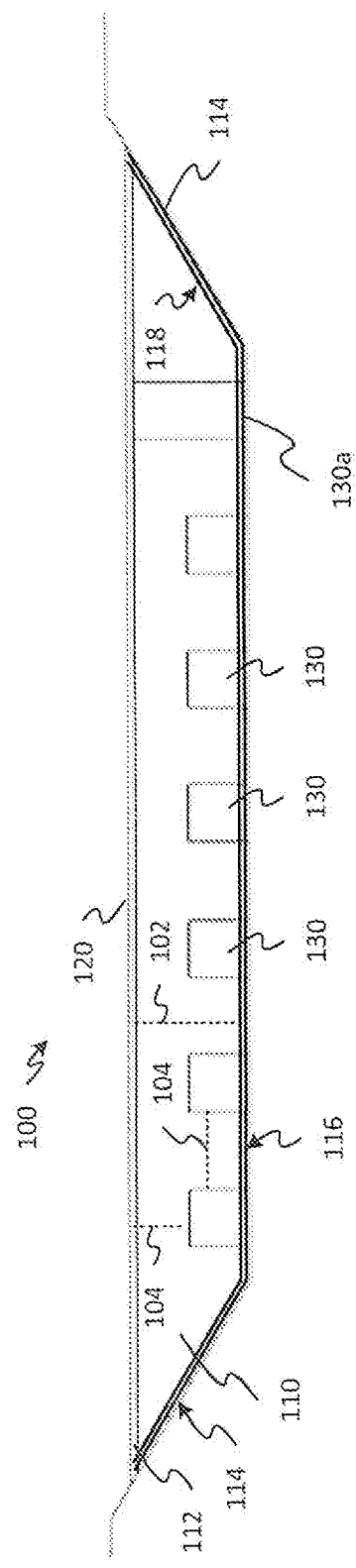
FIG. 1B is a profile view of the first embodiment of a treatment system including a storage basin, a cover system, and media.

Referring to FIGS. 1A and 1B, a perspective view and a profile view, respectively, of a first embodiment of a treatment system including a storage basin, a cover system, and media is shown as a system 100. As shown in FIGS. 1A and 1B, the system 100 includes a storage basin 110, a cover system 120, and media 130. The storage basin 110 may retain liquid (e.g., wastewater from municipal, industrial, agricultural, or other sources), and the retained liquid may fill the storage basin up to a waterline 112. In an embodiment, one or more perimeter edges 114 of the storage basin 110 may be sloped, as shown in FIGS. 1A and 1B. In an additional or alternative embodiment, the perimeter edges 114 may be vertical, such as when the storage basin is a tank or other manmade structure. In another additional or alternative embodiment, the perimeter edges 114 may include sloped edges and vertical edges.

The liquid retained in the storage basin 110 may have a depth 102, where the depth 102 corresponds to a distance between the waterline 112 and a floor 116 of the storage basin. It is noted that, in some embodiments, the depth 102 may vary across the entirety of the storage basin 110. For example, the depth 102 may not be uniform across the entire floor 116, such as when the floor 116 is not perfectly level. Additionally, because the perimeter edges 114 of the storage basin 110 may be sloped, the depth 102 of the liquid may vary along the perimeter edges 114 relative to the floor 116. In an embodiment, the depth 102 may be substantially uniform along the floor 116 of the storage basin 110, and may only vary with respect to the depth along the perimeter edges 114 (e.g., when the perimeter edges 114 are sloped).

It is further noted that the waterline 112 may fluctuate depending on the volume of liquid provided to the storage basin 110, the rate at which the liquid is provided to the storage basin 110, the rate at which the liquid is removed from the storage basin, or other factors. In an embodiment, a perimeter of the storage basin 110 may be rectangular. In an additional or alternative embodiment, the perimeter of the storage basin 110 may be square. In yet another additional or alternative embodiment, the perimeter of the storage basin 110 may be circular. In other embodiments, the perimeter of the storage basin 110 may have another shape.

In an embodiment, the perimeter edges 114 and the floor 116 may be covered with a liner 118 (shown in FIG. 1B). The liner may be formed from a substantially liquid impermeable material, such as a 60 mil (60/1000 inch thick) HDPE (high-density polyethylene) geomembrane. In an embodiment, the substantially liquid impermeable material used to form the liner may only be available in sizes that are smaller than the dimensions of the storage basin 110, and multiple pieces of the substantially liquid impermeable material may be seamed together (e.g., using welds, adhesives, fasteners, etc.) to form the liner. The liner may extend beyond the perimeter edges of the storage basin 110 such that the liner extends beyond a highest expected level of the waterline 112.

The cover system 120 may be sized and dimensioned to cover the storage basin 110. In an embodiment, the cover system 120 may be formed from a substantially liquid and gas impermeable material, such as an 80 mil HDPE geomembrane. In an embodiment, the substantially liquid and gas impermeable material used to form the cover system 120 may only be available in sizes that are smaller than the required dimensions of the cover system 120, and multiple pieces of the substantially liquid and gas impermeable material may be seamed together (e.g., using welds, adhesives, fasteners, etc.) to form the cover system 120. In an embodiment, the cover system 120 may have a width and length corresponding to the width and length of a surface area of the storage basin 110. For example, when the perimeter of the storage basin 110 has a rectangular, square, or circular shape, the width and length of the cover system 120 may be sized and dimensioned to substantially cover the entire square or rectangular surface area of the storage basin 110. It is noted that the size and dimension of the cover system 120 may be larger than the actual surface area of the storage basin 110. For example, the cover system 120 may be sized and dimensioned to be larger than the perimeter of the storage basin 110 so that the cover system 120 covers the entire surface area of the storage basin 110 and overlaps an area immediately surrounding the perimeter edges 114 of the storage basin 110. In an embodiment, the cover system 120 may overlie the area defined by the perimeter edges of the liner, such that the cover system 120 extends beyond a highest expected level of the waterline 112. In an additional or alternative embodiment, the cover 120 may only cover a portion of the storage basin 110, as described further with reference to FIG. 6.

In an embodiment, the cover system 120 may include floats to cause the cover system 120 to float upon the surface of the liquid retained in the storage basin 110. The floats may be formed from a synthetic material and may be of sufficient thickness (e.g., ¼ of an inch or more) to support the weight of the cover system 120. In an embodiment, liquid and gas impermeable material used to form the cover system 120 may include a plurality of layers, and the floats may be disposed between two or more of the plurality of layers. In an embodiment, the cover system 120 may be insulated. In an embodiment, the insulation of the cover system may be provided, at least in part, by the one or more floats. In an additional or alternative embodiment, the cover system 120 may not be insulated.

In an embodiment, the cover system 120 may include anchor flaps that may be used to secure the cover system 120 into a desired position. In an embodiment, the anchor flaps may be at least partially buried (e.g., in an anchor trench) to secure the cover system 120 into the desired position. In an additional or alternative embodiment, other anchoring systems may be used to secure the cover system 120 into a desired position. In an embodiment, the cover system 120 may be coupled (e.g., by welding or other techniques) to the liner to form a liquid and/or gas tight seal.

In an embodiment, the cover system 120 may include a gas collection system for collecting gases that may be generated by the treatment processes or otherwise released from the liquid retained in the storage basin 110. For example, the components to facilitate the collection of gases may include a perimeter pipe (not illustrated) placed between the cover and the liner around the perimeter of the storage basin 110 and the cover system 120. In an embodiment, the perimeter pipe may be a corrugated pipe to collect the gases, and to allow the gases to travel to a vent (not illustrated) for allowing gases to escape from the cover system 120.

In an embodiment, the cover system 120 may be an insulated cover system. For example, the cover system 120 may include a first layer of material, a second layer of material, and a flotation medium, such as a layer of foam or other material, may be disposed between the first and second layers of material. The flotation medium may be an insulating layer that is configured to retain heat within the storage basin. In an embodiment, the first layer of material and the second layer of material may be formed from the liquid and gas impermeable material. In an additional or alternative embodiment, the first layer of material may be formed from a liquid impermeable layer, and the second layer of material may be formed from the liquid and gas impermeable material. In yet another additional or alternative embodiment, the first layer of material may be formed from the liquid and gas impermeable layer, and the second layer of material may be formed from the liquid impermeable material. In still other additional or alternative embodiments, the cover may include more than three layers, or less than three layers. For example, some embodiments may utilize a single layer cover, while other embodiments may utilize a two-layer cover, while still other embodiments may include a cover comprising four or more layers depending on a particular application and configuration of the cover system 120.

In an embodiment, the cover system 120 may be a modular cover system including a plurality of casings. Each of the plurality of casings may be formed from the liquid and gas impermeable material described above and may include one or more floats. During construction of the cover system 120, adjacent casings of the plurality of casings may be attached together using welds, using fasteners (e.g., screws, rivets, bolts, ties, adhesive strips, glues, or other types of fasteners), or using a combination of welds and fasteners. Forming the cover system 120 using casings may simplify construction of the cover system 120 (e.g., because the casings may be of a more manageable size, etc.).

The media 130 may be disposed within the liquid retained in the storage basin 110. In the embodiment of FIG. 1A, the media is shown as being in contact with the floor 116 of the storage basin 110, and extending upward towards the cover system 120. In an embodiment, the media 130 may be separated from (i.e., not in contact with) the cover system 120 by a distance 104. It is noted that the distance 104 may be variable depending on the type of media 130 used.

The media 130 may be formed from a synthetic material, and may promote growth and proliferation of microbial populations within the liquid retained in the storage basin 110. For example, the media 130 may provide an increased surface area upon which the microbial populations may grow, and may also reduce the likelihood that the microbe populations will be insufficient for treatment of the liquid. The microbial populations may be used to treat the liquid while the liquid is retained within the storage basin 110. The microbes and their enzymes may break down organic substances present in the liquid into forms where they can be consumed, degraded or decayed. In aerobic processes, such as nitrification, the microbes may also oxidize reduced forms of nitrogen, and, in anaerobic processes, such as denitrification, oxidized forms of nitrogen are reduced to gaseous forms, which can then escape into the atmosphere (e.g., in an embodiment where the cover system 120 includes vents for releasing gases), or, in some embodiment, may be captured by the gas collection system described above.

In an embodiment, the media 130 may include bio-film media, Mixed Bed Biological Reactor (mbbr) media, ceramic media, textile based media, plastic media, "curly" media (e.g., a linear strand of synthetic material having a plurality of loops disposed along the length of the linear strand), sessile media, aggregate media, sand-based media, gravel-based media, rock-based media, a trickling filter, bio-web media, random media, cross flow media, moving bed media, or combinations thereof. Additionally, the media 130 may be configured to allow the liquid to flow through the media randomly, diagonally, horizontally, vertically, or combinations thereof.

In an embodiment, the media 130 may be of varying widths, lengths, configurations, and densities. For example, some media of the media 130 may have a first height and/or thickness while other media (e.g., the media 130a) of the media 130 may have a second height and/or thickness that is different from the first height and/or thickness. In an embodiment, the spacing 106 between adjacent media 130 may be uniform. In another embodiment, the spacing 106 between adjacent media 130 may be non-uniform (e.g., a spacing 106 between a first pair of adjacent media 130 may be a first distance and spacing 106 between a second pair of adjacent media may be a second distance). In an additional or alternative embodiment, the spacing 106 between some adjacent pairs of media 130 may be uniform relative to each other, but may be different relative to spacing between other adjacent pairs of media 130.

In an embodiment, the media 130 may be retained within a liquid permeable structure that is detached from the cover system 120. For example, the media 130 may come in pre-determined sizes, and multiple pieces of media 130 may be enclosed in a frame or housing that is configured to allow the liquid retained in the storage basin 110 to penetrate and/or pass through the multiple pieces of media 130. In an additional or alternative embodiment, the media 130 may be a standalone structure. For example, the media 130 may have a honeycomb like structure and may be formed into a rectangular structure (or another shaped structure) and may be submerged within the liquid retained in the storage basin. The honeycomb like structure may provide pockets where the microbial populations may proliferate and be shielded, at least in part, from the forces of the liquid flowing through the storage basin 110 and forces of coming in contact with other media while remaining in contact with the liquid (e.g., for purposes of treating the liquid). This may provide improved retention of the microbial populations on the surfaces of the media 130. In another additional or alternative embodiment, the media 130 may be formed from a textile material having a plurality of loops disposed along the length of the textile material. The plurality of loops may provide pockets where the microbial populations may proliferate and be shielded, at least in part, from the forces of the liquid flowing through the storage basin 110 while remaining in contact with the liquid (e.g., for purposes of treating the liquid). This may provide improved retention of the microbial populations on the surfaces of the media 130. It is noted that although particular examples of types and configurations of media have been described, such exemplary media types and configurations are provided for purposes of illustration, rather than by way of limitation, and the present disclosure is not intended to be limited to the specific examples disclosed herein.

Although not shown in FIGS. 1A and 1B, the storage basin 110 may include an inlet, an outlet, one or more filters, and other structures/features such as mixers, aspirators, aerators, etc. The inlet may be configured to allow the liquid to flow into the storage basin 110 from an upstream source (e.g., an upstream storage basin, a wastewater outlet of a municipal, industrial, or agricultural source, etc.), and the outlet may be configured to allow the liquid to flow from the storage basin 110 to a downstream reservoir (e.g., a downstream storage basin, a body of water, another treatment facility or structure, etc.). In an embodiment, the inlet and outlet may operate to provide the liquid to, and to remove water from, the storage basin 110, continuously or at a pre-determined rate of flow, or at pre-determined times (e.g., once every day, every 2 days, every week, etc.) depending on a particular configuration of the system 100. The one or more filters may include filters located between the media 130 and the inlet to remove coarse solids from the liquid flowing into the storage basin 110 from the inlet. This may prevent the coarse solids from coming into contact with the media 130, and potentially blocking or restricting the liquid from flowing through the media 130 so as to be treated by the microbial populations residing thereon. The mixer(s) may provide for movement of the liquid, which may aid in forcing the liquid to pass through the media 130 and be treated by the microbial populations residing thereon. In an embodiment, the mixer(s) may be coupled to one or more floats and may rest underneath the cover system 120 or on the surface of the liquid or equal or above the cover system 110 or liquid surface. In an additional or alternative embodiment, the mixer(s) may rest upon a surface external to the storage basin 110 (e.g., along an outer edge of the storage basin 110), and a drive shaft may extend under the cover system 120 and into the liquid, where a prop attached to the drive shaft provides mixing underneath the cover system 120. The aspirator may force air through a pipe projecting into the liquid and a prop may mix the air into the liquid. In an embodiment, the aspirator may be coupled to one or more floats and may rest underneath the cover system 120 and on the surface of the liquid. In an additional or alternative embodiment, the aspirator may rest upon a surface external to the storage basin 110 (e.g., along an outer edge of the storage basin 110), and the pipe may extend under the cover system 120 and into the liquid. The aerator may provide air to an air system. The air system may include one or more pipes, tubes, etc. configured to distribute the air throughout the liquid retained in the storage basin 110. In an embodiment, the air system may be a fine bubble diffusion air system. In an additional or alternative embodiment, the air system may be a coarse bubble diffusion air system. In another additional or alternative embodiment, the air system may provide both fine and coarse bubble diffusion. It is noted that the mixer(s), aspirator(s), and aerator(s) may be placed, under, behind, in, or ahead of the media 130 and/or in various sections of the storage basin 110.

During operation, the system will receive water (e.g., the liquid retained in the storage basin 110). The storage basin 110 may or may not follow an anaerobic process. Bar screens or other devices (e.g., the one or more filters described above) may be used to remove large solids contained within the influent waste stream. The water within the storage basin 110 may be aerated (e.g., using fine bubble diffusion, coarse bubble diffusion, or both), and may be aspirated depending upon depth and length to width ratios of the storage basin 110. The aeration may increase the amount of dissolved oxygen within the storage basin 110, and the dissolved oxygen may be used by bacteria to consume, digest, and/or decay organic compounds commonly referred to as biochemical oxygen (BOD) and/or used to convert ammonia. Several forms of bacteria such as aerobic, facultative and anaerobic bacteria may be present within the storage basin 110 depending upon operation of the treatment process, location within the basin, and depth of bio-solids and the level of organic loading.

The water will flow to a media system, where the media provides a substrate for microbes to attach to and develop high population densities. A higher microbe population generally will be able to treat a higher flow (Q) and loading. As a result of this biological activity, BOD and ammonia are reduced. Excess and older microbial growth will slough off the media and be deposited on the basin floor to be digested by other microbes. Ammonia will be converted to nitrate and nitrite, which can be further reduced if it enters into a low or no oxygen environment. Denitrification bacteria can remove the oxygen in the molecule (e.g., the nitrate or nitrite) down to nitrogen gas.

The system 100 uses the cover system 120 to retain water temperature because open water systems lose significant amounts of heat through the water surface, thus adversely impacting biological activity. For example, loss of temperature affects autotrophic bacteria first, followed by heterotrophic populations. The cover system 120 reduces heat loss, which creates an environment that is more conducive to stable, year-round bacterial populations. The cover system 120 also promotes settling of solids and prohibiting algae growth by blocking sunlight.

The system 100, operating in the manner described above, may realize improved performance over existing treatment systems (e.g., treatment systems including media or cover systems, but not both). For example, as temperatures cool, the liquid retained within or provided to the storage basin also cools, which may cause the treatment process performed by the microbial populations residing on the media to slow down, and in some instances killing the microbial populations. When this occurs, the treatment process underperforms or ceases, reducing the effectiveness of the treatment system or nullifying the treatment system. Additionally, the cooler temperatures typically have little effect on the volume of liquid that requires treatment so that, even as temperatures cool, the amount of liquid passed through the treatment system may remain relatively constant. Thus, as temperatures of the liquid cool and the microbial populations decline, treatment systems including only media are less likely to adequately treat the liquid. However, the system 100 illustrated in FIGS. 1A and 1B includes both the cover system 120 and the media 130. In such a configuration, the cover system 120 provides insulation to the liquid retained in the storage basin 110, thereby reducing the effects of temperature fluctuations and reducing the loss of microbial populations and the decline of the treatment process provided by the microbial populations. Additionally, the media 130 provides an environment where the microbial populations can grow and thrive, thereby increasing the effectiveness of the treatment process and increasing the volume of liquid that may be treated using the system 100.

As another example, while treatment systems having only cover systems receive the insulating effects provided by the cover system 120, such treatment systems are susceptible to loss of microbial populations due to other causes, such as settling of floc or population washing out due to high flows, or I&I. For example, in treatment systems that do not include media, microbial populations may be found suspended in the liquid retained in the storage basin. Over time, these microbial populations may grow in size until they reach a point where the size of the microbial population causes it to settle to the bottom of the storage basin. This process is known as flocculation. When this occurs, the microbial populations that have settled to the bottom of the storage basin typically die, and, at the very least, the effectiveness at which they treat the liquid is greatly reduced. This causes fluctuations in the effectiveness of the treatment of the liquid and reduces the efficiency of the treatment system. In contrast, the system 100 of FIGS. 1A and 1B includes the cover system 120 and the media 130. Thus, the system 100 is less likely to suffer loss of microbial populations due to floc, is less susceptible to fluctuations in the effectiveness of the treatment process, and is able to treat a larger volume of liquid in a reduced amount of time (e.g., due to the increased or more stable operational efficiency provided by the microbial populations residing on the media 130).

Referring to FIGS. 2A and 2B, a perspective view, and a profile view, respectively, of a second embodiment of a treatment system including a storage basin, a cover system, and media. In FIGS. 2A and 2B, the storage basin 110, the cover system 120 (e.g., a single layer cover system, an insulated cover system, a modular cover system, another form of multi-layer cover system, etc.), and the media 130 of FIGS. 1A and 1B are shown. However, the embodiment of the system 200 illustrated FIGS. 2A and 2B differs from the system 100 of FIGS. 1A and 1B in that the media 130 is situated upon platforms 210. As shown in FIGS. 2A and 2B, the platforms 210 may raise the media off of the floor 116 of the storage basin 110. Thus, in the system 200 of FIGS. 2A and 2B, the media 130 is not in direct contact with a bottom surface (e.g., the floor 116) of the storage basin 110 when the media 130 is supported by the one or more platforms 210. Such a configuration may cause the system 200 to realize improved performance over the system 100. For example, by raising the media 130 off of the floor 116, the media is less likely to become partially blocked blocks by sediment and other debris that settle to the floor 116 of the storage basin 110. As another example, improved circulation of the liquid may be realized as the liquid may flow above, below, and around the media 130. This may increase the volume of liquid exposed to and treated by the microbial populations residing on the media 130. Thus, the configuration of the system 200 may provide a more efficient treatment system that is capable of treating larger volumes of liquid in a shorter amount of time relative to the system 100, while still retaining all of the benefits provided by the system 100, such as reduced loss of microbial populations and treatment effectiveness due to temperature drops, flocculation, washing out from high flow or I&I, or other causes.

Additionally, it is noted that the media 130 used in system 200 may extend from the platform upon which the media 130 resides on up to the waterline 112, and may come in contact with the cover system 120, but is not coupled to the cover system 120. In an embodiment, the media 130 of the system 200 may include different types of media and/or media formed from different materials. For example, the media 130 of the system 200 may include bio-film media, Mixed Bed Biological Reactor (mbbr) media, ceramic media, textile based media, plastic media, "curly" media (e.g., a linear strand of synthetic material having a plurality of loops disposed along the length of the linear strand), sessile media, aggregate media, sand-based media, gravel-based media, rock-based media, a trickling filter, bio-web media, random media, cross flow media, moving bed media, or combinations thereof. Additionally, the media 130 may be configured to allow the liquid to flow through the media randomly, diagonally, horizontally, vertically, or combinations thereof.

In an embodiment, the media 130 may be of varying widths, lengths, configurations, and densities. For example, some media of the media 130 may have a first height and/or thickness while other media (e.g., the media 130a) of the media 130 may have a second height and/or thickness that is different from the first height and/or thickness. In an embodiment, the spacing 106 between adjacent media 130 may be uniform. In another embodiment, the spacing 106 between adjacent media 130 may be non-uniform (e.g., a spacing 106 between a first pair of adjacent media 130 may be a first distance and spacing 106 between a second pair of adjacent media may be a second distance. In an additional or alternative embodiment, the spacing 106 between some adjacent pairs of media 130 may be uniform relative to each other, but may be different relative to spacing between other adjacent pairs of media 130.

Referring to FIGS. 3A and 3B, a perspective view, and a profile view, respectively, of a third embodiment of a treatment system including a storage basin, a cover system, and media is shown as a system 300. In FIGS. 3A and 3B, the storage basin 110, the cover system 120 (e.g., a single layer cover system, an insulated cover system, a modular cover system, another form of multi-layer cover system, etc.), and the media 130 of FIGS. 1A, 1B, 2A, and 2B are shown. However, the system 300 of FIGS. 3A and 3B differs from the system 100 of FIGS. 1A and 1B and the system 200 of FIGS. 2A and 2B in that the media 130 is coupled to the cover system 120.

In embodiments utilizing modular cover systems 120, as described above with reference to FIGS. 1A and 1B, the modular cover system may include one or more media modules having media attached thereto. The one or more media modules may be coupled to one or more of the plurality of casings used to form the modular cover system. For example, the media module may be formed of the same material as the casings, and the media 130 may be coupled to the media module using a welding technique, adhesive strip, fasteners, glues, other techniques, or a combination thereof. In such an embodiment, the media modules may be coupled (e.g., using a welding technique, adhesive strip, fasteners, glues, other techniques, or a combination thereof) to the one or more casings at an intersection between adjacent casings of the plurality of casings. In an additional or alternative embodiment, the media 130 may be partially embedded within the media module, such as through an injection or molding process whereby the liquid and gas impermeable material encapsulates at least a portion of the media 130 and retains the media 130 securely in a desired position. In an additional or alternative embodiment, structures may be coupled to the bottom surface of the cover system 120, and the media 130 may be coupled to or placed upon the structures.

In an embodiment, the media 130 may be coupled to the cover system 120 (e.g., using structures, media modules, or other techniques), and may extend from the cover system 120 to the floor 116 of the storage basin 110, as shown at 130*a*. In an additional or alternative embodiment, the media 130 may be coupled to the cover system 120 and may extend downward toward the floor 116, but may not directly and intimately contact the floor 116 of the storage basin 110. In another additional or alternative embodiment, the media 130 may be coupled to the cover system 120 (e.g., using one of the techniques described above), but may be offset from the cover system 120. For example, the media 130 may be separated from the cover system 120 such that space exists between an uppermost surface of the media 130 and the bottom surface of the cover system 120, but may still be considered as coupled to the cover system 120. In yet another additional or alternative embodiment, the media 130 may include media having varying heights, widths, lengths, or combinations thereof. In an additional or alternative embodiment, the media 130 may be of varying sizes. For example, some media of the media 130 may have a first height and/or thickness while other media of the media 130 may have a second height and/or thickness that is different from the first height and/or thickness. In an embodiment, the spacing 106 between adjacent media 130 may be uniform. In another embodiment, the spacing 106 between adjacent media 130 may be non-uniform (e.g., a spacing 106 between a first pair of adjacent media 130 may be a first distance and spacing 106 between a second pair of adjacent media may be a second distance). In an additional or alternative embodiment, the spacing 106 between some adjacent pairs of media 130 may be uniform relative to each other, but may be different relative to spacing between other adjacent pairs of media 130.

It is noted that the media 130 of the system 300 may include bio-film media, Mixed Bed Biological Reactor (mbbr) media, ceramic media, textile based media, plastic media, "curly" media (e.g., a linear strand of synthetic material having a plurality of loops disposed along the length of the linear strand), sessile media, aggregate media, sand-based media, gravel-based media, rock-based media, a trickling filter, bio-web media, random media, cross flow media, moving bed media, or combinations thereof. Additionally, the media 130 may be configured to allow the liquid to flow through the media randomly, diagonally, horizontally, vertically, or combinations thereof. Further, although some embodiments are described with reference to particular types of covers (e.g., modular covers, etc.), cover systems coupled to media according to embodiments of the present disclosure may include single or multi-layer cover systems coupled to media, insulated cover systems coupled to media, or other forms and types of cover systems configured to be coupled to media in accordance with one or more aspects of the present disclosure.

In an embodiment, the media 130 may be of varying widths, lengths, configurations, and densities. For example, some media of the media 130 may have a first height and/or thickness while other media (e.g., the media 130*a*) of the media 130 may have a second height and/or thickness that is different from the first height and/or thickness. In an embodiment, the spacing 106 between adjacent media 130 may be uniform. In another embodiment, the spacing 106 between adjacent media 130 may be non-uniform (e.g., a spacing 106 between a first pair of adjacent media 130 may be a first distance and spacing 106 between a second pair of adjacent media may be a second distance. In an additional or alternative embodiment, the spacing 106 between some adjacent pairs of media 130 may be uniform relative to each other, but may be different relative to spacing between other adjacent pairs of media 130.

The configuration of the system 300 including media 130 that is coupled to the cover system 120 may cause the system 300 to realize improved performance over the system 100. For example, by raising the media 130 off of the floor 116, the media 130 is less likely to become partially blocked by sediment and other debris that settle to the floor 116 of the storage basin 110. As another example, improved circulation of the liquid may be realized as the liquid may flow above, below, and around the media 130, such as when the media 130 is offset from the bottom surface of the cover system 120. This may increase the volume of liquid exposed to and treated by the microbial populations residing on the media 130. Thus, the configuration of the system 300 may provide a more efficient treatment system that is capable of treating larger volumes of liquid in a shorter amount of time relative to the system 100, while still retaining all of the benefits provided by the system 100, such as reduced loss of microbial populations and treatment effectiveness due to temperature drops and/or flocculation or other causes.

Figure 4:
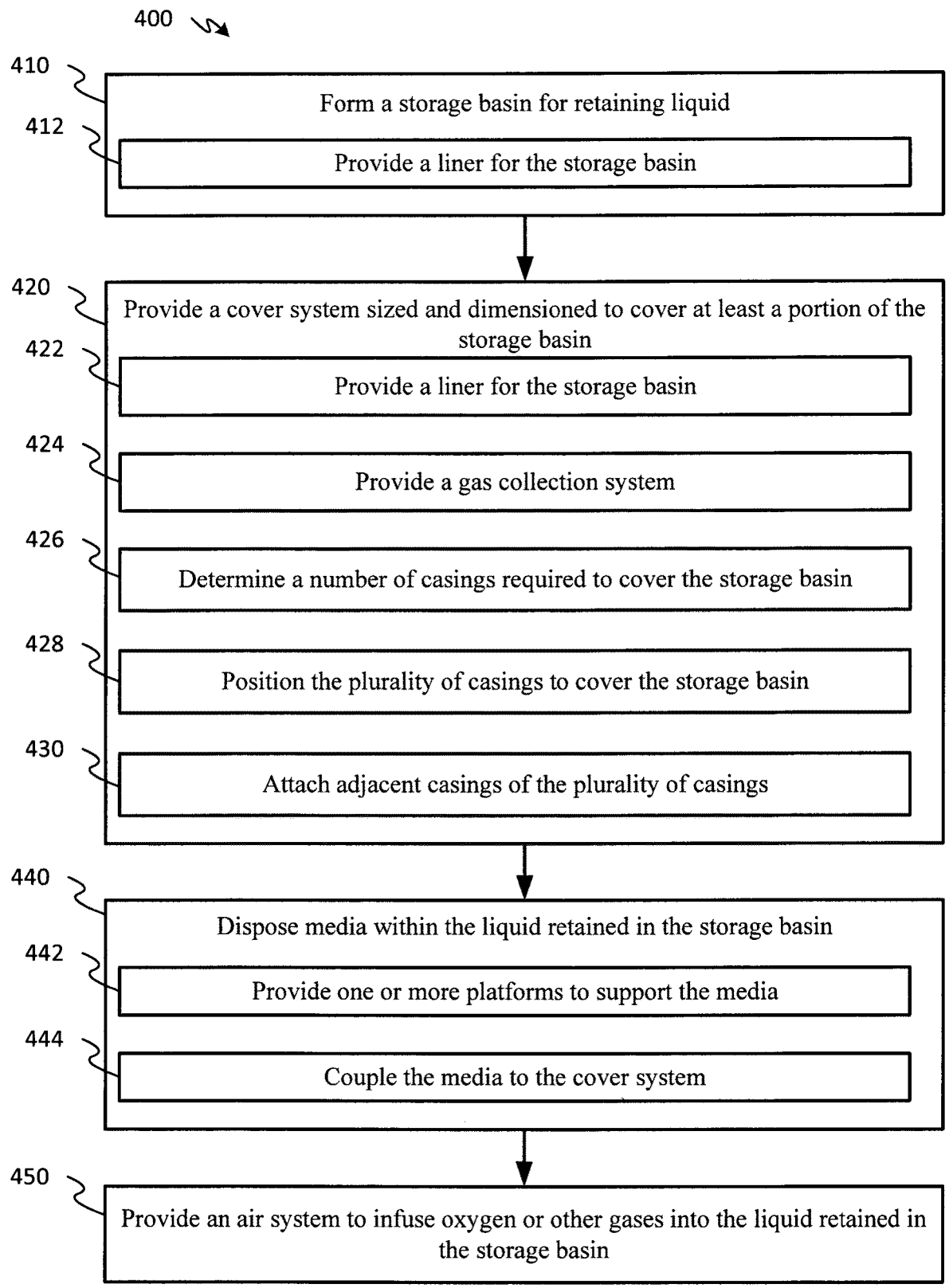
FIG. 4 is a flow diagram of an exemplary method for configuring a treatment system according to embodiments of the present disclosure.

Referring to FIG. 4, a flow diagram of an exemplary method for configuring a treatment system according to embodiments of the present disclosure is shown as a method 400. At 410, the method 400 includes forming a storage basin for retaining liquid. In an embodiment, the storage basin may be the storage basin 110 described with reference to FIGS. 1A-3B. In an embodiment, the method 400 may include, at 412, providing a liner for the storage basin. As described with reference to FIGS. 1A-3B, the liner may be formed from a liquid impermeable material. In an embodiment, the liner may be the liner described with reference to FIGS. 1A-3B, and may cover the floor and walls (e.g., sloped walls, vertical walls, etc.) of the storage basin.

At 420, the method 400 includes providing a cover system sized and dimensioned to cover at least a portion of the storage basin. In an embodiment, the cover system may be the cover system 120 of FIGS. 1A-3B, and may cover the entire storage basin. In an additional or alternative embodiment, the cover system may cover less than the entire storage basin, as illustrated in FIG. 6. As described with reference to FIGS. 1A-3B, the cover system may be formed from a liquid and gas impermeable material. In an embodiment, the method 400 includes, at 422, providing a liner for the storage basin. The liner may be coupled to the cover system, as described with reference to FIGS. 1A and 1B. In an embodiment, the liner may be formed of naturally occurring materials, such as clay or another type of soil. In an embodiment, the storage basin may not include a liner at all, and the floor of the storage basin may be the naturally occurring soil present when the storage basin was formed. In an embodiment, providing the cover system may include, at 424, providing a gas collection system. In an embodiment, the gas collection system may be the gas collection system(s) described above with reference to FIGS. 1A and 1B.

In an embodiment, the cover system may be an insulated cover system. In an additional or alternative embodiment, the cover system may be a modular cover system formed from a plurality of casings, and the method 400 may include, at 426, determining a number of casings required to cover the storage basin, at 428, positioning the plurality of casings to cover the storage basin, and, at 430, attaching adjacent casings of the plurality of casings. The adjacent casings may be attached using welds, fasteners, adhesive strips, glues, or a combination thereof.

At 440, the method 400 includes disposing media within the liquid retained in the storage basin. In an embodiment, the media may be the media 130 of FIGS. 1A-2B (i.e., detached media). In an embodiment, the media may be disposed within the liquid by placing the media on a floor of the storage basin, as described with reference to FIGS. 1A and 1B. In an additional or alternative embodiment, the method 400 may include, at 442, providing one or more platforms to support the media, where the media is disposed within the liquid by placing the media on the one or more platforms. As explained with reference to FIGS. 2A and 2B, placing the media on the one or more platforms may improve the performance of the treatment system. For example, as the treatment process occurs, solids may be generated and may settle to the bottom of the storage basin. By placing the media on top of the one or more platforms, the solids that settle to the bottom of the storage basin may not restrict or otherwise block the flow of the liquid through the media.

In an additional or alternative embodiment, disposing the media within the liquid retained in the storage basin may include, at 444, coupling the media to the cover system. In this additional or alternative embodiment, the media may be the media 130 of FIGS. 3A and 3B and may be coupled to the cover system using welds, fasteners, glues, adhesive strips, a molding process, or other techniques, as described above with respect to FIGS. 3A and 3B. For example, the media may be coupled to a single layer cover system, a multi-layer cover system, an insulated cover system, etc. In some embodiments, the media may be attached to the cover system by incorporating media modules (e.g., for modular cover systems), as described with reference to FIGS. 3A and 3B. Using media modules and modular cover systems may simplify installation of the cover system, and may make replacement of damaged media easier (i.e., since a media module may be removed, repaired, and/or replaced without requiring draining of the storage basin or removal of substantial portions of the cover system). In other embodiments, the media may be attached to the cover system at an intersection between adjacent casings of the plurality of casings. For example, the media may be disposed within a frame or housing, as described with reference to FIGS. 1A-3B, or may be a standalone structure that may be attached to the casings using fasteners, welds, adhesive strips, glues, or other techniques during the coupling of the adjacent casings. In still other additional or alternative embodiments, the media may be attached to the cover by coupling supports to the cover system. The supports may be coupled to, or may house the media.

In an embodiment, the method 400 includes, at 450, providing an air system to infuse oxygen or other gases into the liquid retained in the storage basin. In an embodiment, the air system may be a fine bubble diffusion system. In an additional or alternative embodiment, the air system may be a coarse bubble diffusion system. In yet another additional or alternative embodiment, the air system may be a combination of fine and coarse bubble diffusion systems. In an additional or alternative embodiment, the air system may include a floating aspirator system, a floating aeration system, a standalone (i.e., non-floating) aspirator system, a standalone (i.e., non-floating) aeration system, or a combination thereof.

Treatment systems configured or constructed using the method 400 may realize improved performance relative to conventional treatment systems (i.e., treatment systems that use covers or media, but not both). For example, as temperatures cool, the liquid retained within or provided to the storage basin also cools, which may cause the treatment process performed by the microbial populations residing on the media to slow down, and in some instances killing the microbial populations. When this occurs, the treatment process underperforms or ceases, reducing the effectiveness of the treatment system or nullifying the treatment system. Additionally, the cooler temperatures typically have little effect on the volume of liquid that requires treatment so that, even as temperatures cool, the amount of liquid passed through the treatment system may remain relatively constant. Thus, as temperatures of the liquid cool and the microbial populations decline, storage basins including only media are is less likely to adequately treat the liquid. However, treatment systems according to embodiments include both media and cover systems. In such a configuration, the cover system provides some degree of insulation to the liquid retained in the storage basin, thereby reducing the effects of temperature fluctuations and reducing the loss of microbial populations and the decline of the treatment process provided by the microbial populations.

As another example, while treatment systems having only cover systems receive the insulating effects provided by the cover system, such treatment systems are susceptible to loss of microbial populations due to other causes, such as settling of floc or populations washing out due to high flows, or I&I. For example, in treatment systems that do not include media, microbial populations may be found suspended in the liquid retained in the storage basin. Over time, these microbial populations may grow in size until they reach a point where the size of the microbial population causes it to settle to the bottom of the storage basin. This process is known as flocculation. When this occurs, the microbial populations that have settled to the bottom of the storage basin typically die, and, at the very least, the effectiveness at which they treat the liquid is greatly reduced. This causes fluctuations in the effectiveness of the treatment of the liquid and reduces the efficiency of the treatment system. In contrast, treatment systems configured according to the method 400 include both cover systems and media. Thus, treatment systems configured according to the method 400 are less likely to suffer loss of microbial populations due to settling of floc or populations washing out due to high flows, or I&I, are less susceptible to fluctuations in the effectiveness of the treatment process, and are able to treat a larger volume of liquid in a reduced amount of time (e.g., due to the increased or more stable operational efficiency).

It is noted that although specific embodiments of treatment systems and methods for configuring treatment systems have been described with reference to FIGS. 1A-4, other configurations are contemplated by the present disclosure. For example, in an embodiment, a treatment system may include media (e.g., the media 130 of FIGS. 1A-3B) that are positioned on the floor of the storage basin, as described with reference to FIGS. 1A and 1B, on platforms, as described with reference to FIGS. 2A and 2B, coupled to the cover system, as described with reference to FIGS. 3A and 3B, or combinations thereof, or an independent body of media supported by its own independent float system.

Referring to FIGS. 5A and 5B, a perspective view, and a profile view, respectively, of various embodiments of media configurations for use in conjunction with a treatment system are shown. In FIGS. 5A and 5B, the storage basin 110 and the cover system 120 of FIGS. 1A-3B are shown. Additionally, in FIGS. 5A and 5B, various media configurations 530, 532, 534 are shown. As illustrated in FIGS. 5A and 5B, media used in conjunction with a treatment system may include sections of media having a first thickness, as in the media 530, and media having a second thickness, as in the media 532 and 534. Additionally, the media may have varying heights, as illustrated with respect to the media 532 and 534. Additionally, the treatment system may include a zone of media. For example, the region comprising the media 532, 534, may be considered a zone of media (e.g., a large section of the storage basin volume having a high concentration of media disposed therein). Thus, embodiments of the present disclosure include treatment system configurations having media of one or more thicknesses, widths, heights, densities, types, etc. Further, some embodiments may include both attached media (e.g., media attached to the cover system 120) and detached media (e.g., media configured on platforms, on the floor 116, or both). It should be noted there may be pond(s), tank(s), or discrete cell(s) upstream or downstream, not shown in FIG. 5. For example, the treatments system may be a one basin treatment system or may be part of a multi-basin treatment system.

Additionally, although the cover systems described with reference to FIGS. 1A-5 have been illustrated as covering the entire surface of the storage basin, some embodiments may use cover systems that partially cover the entire surface area of the storage basin. For example, and referring to FIG. 6, a plan view of various configurations of treatment systems configured according to embodiments are shown. In FIG. 6, a first treatment system configuration 610, a second treatment system configuration 620, a third treatment system configuration 630, a fourth treatment system configuration 640, and a fifth treatment system configuration 650 are shown. Additionally, in FIG. 6, it is assumed that the inlet is positioned on the bottom of each of the treatment system configurations 610-650, and that the flow of liquid travels from the bottom of FIG. 6 to the top of FIG. 6, as shown by the arrow 602.

In the first treatment system configuration 610, a cover system 614 is shown covering a portion of the storage basin 612, and media 616 is shown being disposed in an uncovered portion of the storage basin 612. It is noted that in the first treatment system configuration 610, the cover system 614 may only cover a portion of the storage basin 612 on an inlet side of the storage basin 612. In the second treatment system configuration 620, a cover system 624 is shown covering a portion of the storage basin 622, and media 626 is shown being disposed in an uncovered portion of the storage basin 622. It is noted that in the second treatment system configuration 620, the cover system 624 may only cover a portion of the storage basin 622 on an outlet side of the storage basin 622. In the third treatment system configuration 630, a cover system 634 is shown covering a portion of the storage basin 632, and media 636 is shown being disposed in a covered portion of the storage basin 632. It is noted that in the third treatment system configuration 630, the cover system 634 may only cover a portion of the storage basin 632 on an outlet side of the storage basin 632. However, embodiments of treatment systems having a cover system that covers a portion of the storage basin on an inlet side of the storage basin and having media disposed underneath the covered portion of the storage basin are also contemplated by the present disclosure. In the fourth treatment system configuration 640, a cover system 644 is shown covering a middle portion of the storage basin 642 where the inlet and outlet sides of the storage basin are uncovered, and media 646 is shown being disposed under the covered portion of the storage basin 642. However, embodiments of treatment systems having a cover system that covers a middle portion of the storage basin and having media disposed in an uncovered portion of the storage basin on the inlet side of the storage basin, the outlet side of the storage basin, or both are also contemplated by the present disclosure. In the fifth treatment system configuration 650, a cover system 654 is shown covering the entire storage basin 652, and media 656 is shown being disposed under the covered portion of the storage basin 652.

Thus, embodiments of the present disclosure include treatment system configurations where the media may be disposed underneath the cover system, within an area of the storage basin that is not covered by the cover system, or both. It is noted that the portion of the storage basin that is covered by the cover system may be proximate an inlet side of the storage basin, as in the first configuration 610, an outlet side of the storage basin, as in the second configuration 620 and/or the third configuration 630, or a middle portion of the storage basin, as in the fourth configuration 640. Other embodiments of treatment systems according to the present disclosure may include floating media (e.g., media attached to a buoyant structure that suspends the media within the liquid retained in the storage basin). In some embodiments, the media may be weighted to cause the media to maintain an elongated shape. For example, when the media is formed from strands or strips of material, as opposed to rigid structures, such as the honeycomb media configurations, the media strands or strips of media may be weighted to prevent the strands or strips from crumpling, folding onto themselves, or otherwise being manipulated to have a reduced surface area suitable for microbial population growth.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of the present disclosure. As such, the various illustrative embodiments of the present disclosure are not intended to be limited to the particular forms disclosed. Rather, they include all modifications and alternatives falling within the scope of the claims, and embodiments other than the one shown may include some or all of the features of the depicted embodiment. For example, components may be combined as a unitary structure, and/or connections may be substituted (e.g., threads may be substituted with press-fittings or welds). Further, where appropriate, aspects of any of the exemplary embodiments described above may be combined with aspects of any of the other exemplary embodiments described to form further embodiment having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A treatment system comprising:
   a storage basin for retaining liquid, the storage basin including perimeter edges and a floor;
   a liner covering the perimeter edges and the floor;
   a cover system sized and dimensioned to cover at least a portion of the storage basin;
   first media disposed within liquid retained in the storage basin; and
   a platform on the liner supporting the first media such that the first media is not in contact with the liner and is in contact with but not coupled to the cover system.

2. The treatment system of claim 1, further comprising:
   second media positioned beneath and coupled to the cover system.

3. The treatment system of claim 1, further comprising:
   second media positioned within a portion of the storage basin that is not covered by the cover system.

4. The treatment system of claim 1, wherein the cover system is an insulated cover system.

5. The treatment system of claim 4, further comprising:
   second media positioned beneath and coupled to the cover system.

6. The treatment system of claim 4, further comprising:
   second media positioned within a portion of the storage basin that is not covered by the cover system.

7. The treatment system of claim 1, wherein the cover system is a modular cover system including a plurality of casings.

8. The treatment system of claim 7, wherein the modular cover system includes one or more media modules having media attached thereto, wherein the one or more media modules are coupled to one or more of the plurality of casings.

9. The treatment system of claim 7, wherein adjacent casings of the plurality of casings are welded together using welds.

10. The treatment system of claim 7, wherein adjacent casings of the plurality of casings are attached using fasteners.

11. The treatment system of claim 7, further comprising:
    second media attached to one or more casings of the plurality of casings.

12. The treatment system of claim 11, wherein the second media is attached to the one or more casings at an intersection between adjacent casings of the plurality of casings.

13. The treatment system of claim 1, wherein the first media is retained in a liquid permeable structure.

14. The treatment system of claim 1, wherein the cover system is configured to float on a surface of the liquid retained in the storage basin.

15. The treatment system of claim 1, further comprising an air system that infuses oxygen or other gases into the liquid retained in the storage basin.

16. The treatment system of claim 15, wherein the air system is a fine bubble diffusion system.

17. The treatment system of claim 15, wherein the air system is a coarse bubble diffusion system.

18. A method for configuring a treatment system comprising:
    providing a liner covering a storage basin having perimeter edges and a floor, wherein the liner covers the perimeter edges and the floor;
    providing a cover system sized and dimensioned to cover at least a portion of the storage basin; and
    disposing first media within liquid retained in the storage basin, wherein the first media is disposed on a platform on the liner that supports the first media such that the first media is not in contact with the liner and is in contact with but not coupled to the cover system.

19. The method of claim 18, further comprising:
    disposing second media within the liquid so that the second media is positioned beneath and coupled to the cover system.

20. The method of claim 18, further comprising:
    disposing second media within the liquid so that the second media is positioned within a portion of the storage basin that is not covered by the cover system.

21. The method of claim 18, wherein the cover system is an insulated cover system.

22. The method of claim 21, further comprising:
    disposing second media within the liquid so that the second media is positioned beneath and coupled to the cover system.

23. The method of claim 21, further comprising:
    disposing second media within the liquid so that the second media is positioned within a portion of the storage basin that is not covered by the cover system.

24. The method of claim 18, wherein the cover system is a modular cover system including a plurality of casings, and wherein the providing the cover system includes:
    determining a number of casings required to cover the storage basin;
    positioning the plurality of casings to cover the storage basin; and
    attaching adjacent casings of the plurality of casings, wherein the adjacent casings are attached using welds, fasteners, or a combination thereof.

25. The method of claim 24, wherein the modular cover system includes one or more media modules having media attached thereto, wherein the method includes attaching the one or more media modules to one or more of the plurality of casings.

26. The method of claim 25, wherein the attaching the one or more media modules to one or more of the plurality of casings comprises attaching the one or more media modules to one or more of the plurality of casings at an intersection between adjacent casings of the plurality of casings.

27. The method of claim 18, wherein the method includes providing an air system to infuse oxygen or other gases into the liquid retained in the storage basin, wherein the air system is a fine bubble diffusion system, a coarse bubble diffusion system, an aspirator system, an aeration system, or a combination thereof.

28. The cover system of claim 2, further comprising:
    third media positioned within a portion of the storage basin that is not covered by the cover system.

29. The cover system of claim 5, further comprising:
    third media positioned within a portion of the storage basin that is not covered by the cover system.

30. The cover system of claim 11, further comprising:
    third media positioned within a portion of the storage basin that is not covered by the cover system.

31. The method of claim 19, further comprising:
    disposing third media within a portion of the storage basin that is not covered by the cover system.

32. The method of claim 26, further comprising:
    disposing second media within a portion of the storage basin that is not covered by the cover system.

33. The method of claim 26, further comprising:
disposing second media within a portion of the storage basin that is not covered by the cover system; and
disposing third media within the liquid so that the third media is positioned beneath and coupled to the cover system.

34. The method of claim 33, wherein the first media is retained in a liquid permeable structure.

\* \* \* \* \*